(12) United States Patent
Tanrikulu

(10) Patent No.: US 6,421,394 B1
(45) Date of Patent: Jul. 16, 2002

(54) COMPUTER METHOD AND APPARATUS FOR MODEM POINT SLICING

(76) Inventor: Oguz Tanrikulu, 164 Hosmer St., Apt. 10, Marlborough, MA (US) 01752

( * ) Notice: Subject to any disclaimer, the term of this patent is extended or adjusted under 35 U.S.C. 154(b) by 0 days.

(21) Appl. No.: 09/224,619

(22) Filed: Dec. 31, 1998

(51) Int. Cl.$^7$ .............................. H04L 5/12; H03D 1/00
(52) U.S. Cl. ...................................... 375/261; 375/341
(58) Field of Search ............................... 375/261, 341, 375/298, 262, 265; 714/794, 795

(56) References Cited

U.S. PATENT DOCUMENTS

| | | | |
|---|---|---|---|
| 4,709,377 A | 11/1987 | Martinez et al. | 375/75 |
| 5,206,854 A | 4/1993 | Betts et al. | 372/32.1 |
| 5,396,519 A | 3/1995 | Betts et al. | 375/296 |
| 5,654,986 A * | 8/1997 | Lim | 375/341 |
| 5,673,293 A * | 9/1997 | Scarpa et al. | 375/321 |
| 6,028,475 A | 2/2000 | Kikuchi | 329/304 |

FOREIGN PATENT DOCUMENTS

| | | |
|---|---|---|
| EP | 0 580 301 A3 | 1/1994 |
| EP | 0 580 301 A2 | 1/1994 |
| EP | 0 680 184 A3 | 11/1995 |
| EP | 0 680 184 A2 | 11/1995 |
| JP | 11 068869 A | 3/1999 |

OTHER PUBLICATIONS

"Trellis Subset Decoder Algorithm Based on a Pattern Recognition Scheme", IBM Technical Disclosure Bulletin, 37(10) :693–697 (1994).

Nobakht, R.A., "A Unified Table Based Trellis Subset Decoder for High Speed Voice—Band Modems", Proceedings of the Global Telecommunications Conference (Globecom), IEEE, 2(28) :677–681 (1994).

M.V. Dyuboglu, "Flexible Precoding for V.Fast", Int. Conf. on Data Transmission—Advances in Modem and ISDN Technology and Applications, vol. 356;ch. 26, No. 356, pp. 13–18, 1992.

L.F. Wei, "Trellis–Coded Modulation with Multi–dimensional Constellations", IEEE Transactions on Information Theory, vol. IT–33; No. 4, Jul. 1987.

G.D. Forney, Jr., "Advances in Modem Technology since v.32/v.32bis", Int. Conf. on Data Transmission—Advances in Modem in ISDN Technology Applications, vol. 356; ch. 26; No. 356, pp. 1–6, 1992.

G.D. Forney, Jr. et al., "The V.34 High–Speed Modem Standard", IEEE Communications Magazine, pp. 28–33, Dec. 1996.

K. Elak, et al., "Implementation for Trellis–Coded Modems", Journal of Communications, vol. 45, pp. 23–29, Hungary, Mar. 1994.

"A Modem Operating at Data Signalling Rates of up to 33 600 bit/5 for use on the General Switched Telephone Network and on Leased Point–to–Point 2–Wire Telephone–type Circuits", ITU Recommendation v. 34, Oct. 9–18, Geneva, 1996.

R. Laroia, et al., "On Optimal Shaping of Multi–Dimensional Constellations", IEEE Transactions of Information Theory, vol. IT–40; No. 4, Jul. 1994.

R. Laroia, "Coding for Intersymbol Intereference Channels–Combined Coding and Precoding", IEEE Transactions on Information Theory, vol. IT–4; No. 4, Jul. 1996.

* cited by examiner

*Primary Examiner*—Chi Pham
*Assistant Examiner*—Khai Tran
(74) *Attorney, Agent, or Firm*—Hamilton, Brook, Smith & Reynolds, P.C.

(57) ABSTRACT

The present invention is a computer method and apparatus of point slicing in digital communication systems employing Quadrature Amplitude Modulation (QAM). This method comprises the steps of providing an infinite lattice, receiving at least one subset of soft points, defining at least one valid constellation boundary, determining a closest valid constellation hard point for each soft point in the subsets of soft points, and reporting the closest valid constellation hard point.

28 Claims, 9 Drawing Sheets

| SNR | 20dB | 25dB | 30dB | | |
|---|---|---|---|---|---|
| CONST.SIZE | FPS | FPS | FPS | IPS | ES |
| 4 | 0.17 | 0.17 | 0.16 | 0.04 | 0.02 |
| 32 | 0.09 | 0.09 | 0.09 | 0.04 | 0.16 |
| 56 | 0.07 | 0.07 | 0.07 | 0.04 | 0.29 |
| 96 | 0.08 | 0.08 | 0.07 | 0.04 | 0.49 |
| 144 | 0.09 | 0.08 | 0.08 | 0.04 | 0.74 |
| 240 | 0.09 | 0.08 | 0.08 | 0.04 | 1.23 |
| 284 | 0.09 | 0.08 | 0.07 | 0.04 | 1.46 |
| 416 | 0.09 | 0.08 | 0.07 | 0.04 | 2.14 |
| 640 | 0.09 | 0.08 | 0.07 | 0.04 | 3.29 |
| 960 | 0.09 | 0.08 | 0.07 | 0.04 | 4.94 |
| 1088 | 0.09 | 0.08 | 0.07 | 0.04 | 5.60 |
| 1664 | 0.08 | 0.08 | 0.07 | 0.04 | 8.56 |

FIG. 9

COMPUTER METHOD AND APPARATUS FOR MODEM POINT SLICING

BACKGROUND OF THE INVENTION

A modem is an electronic device that incorporates both a modulator and a demodulator into a single piece of signal conversion equipment. Interfacing directly to a communication channel, modems establish communication links between various computer systems and terminal equipment. The International Telegraph and Telephone Consultative Committee (CCITT), which determines protocols and standards for telephone and telegraph equipment, has authored a number of recommendations describing modem operation. See CCITT Data Communication Over the Telephone Network Series V Recommendations, BLUE BOOK Volume VIII-Fascicle VIII.1 Melbourne, 1988. In most cases, the communications channel is the general switched telephone network (GSTN) or a two-or four-wire leased circuit. Originally, these channels were assigned for voiceband transmission, so they are bandlimited from 300 hz to 3400 hz. The CCITT V.32. bis recommendation specifies the symbol rate of 2400 bauds per second. See CCITT Recommendation V32.bis Geneva, 1991. To achieve data transmission rates of 7200, 9600, 12000, and 14400 bits per second, three, four, five or six bits must be transmitted in one symbol interval. By adding a single bit to a binary symbol with K bits, the number of waveforms to be produced by the modulator is increased from $2^k + 2^{k+1}$. To achieve the same value of the probability of error, an increase in alphabet size within the same bandwidth requires a 3 dB increase in the signal to noise ratio (SNR).

Traditionally, a modem was implemented using analog discrete components. Today, digital circuits centered around one or two high performance digital signal processors (DSPs) can meet the demands of modem methods without the difficulties associated with analog circuitry. A digital modem implementation offers programmability, realizability of sophisticated methods, temperature insensitivity, ease of design, and often reduced cost when compared with analog implementations.

Modem communication technology has advanced to enable an increase in data communication rates. In order to achieve higher communication rates, communication bandwidth usually expands. But, because phone lines are bandlimited, new techniques for effective data communication rate improvements have emerged.

Another of the CCITT telecommunication standards is the V.34 modem 33.6 kbps. See ITU Recommendation V.34, "A modem operating at data signalling rates of up to 33,600 bit/s for use on the general switched telephone network and on leased point-to-point 2-wire telephone-type circuits", Geneva, Oct. 9–18, 1996. Such variable data rates are made possible by using advanced signal processing techniques such as channel coding using 4D convolutional codes (see L. F. Wei, "Trellis-Coded Modulation with Multi-dimensional Constellations," IEEE Transactions on Information Theory, vol. IT-33, no. 4, July 1987.), shell mapping (see R. Laroia, N. Farvardin, S. A. Tretter, "On Optimal Shaping of Multidimensional Constellations", IEEE Transactions on Information Theory, vol. IT-40, no. 4, July 1994.), preceding (see R. Laroia, "Coding for Intersymbol Interference Channels—Combined Coding and Precoding," IEEE Transactions on Information Theory, vol. IT-4, no. 4, July 1996.), nonlinear encoding (see W. L. Betts, E. S. Zuranski, "Method and Apparatus for Adaptively Providing Precoding and Preemphasis conditioning to Signal Data for Transfer over a Communication Channel," U.S. Pat. No. 5,396,519, March 1995.) and pre-emphasis filtering at the transmitter (see W. L. Betts, prior).

The 4D convolutional codes yield a coding gain above 4.2 db, and an associated Viterbi subset decoder has reduced complexity due to the lower number of state transitions between the states. Shell mapping is a technique for non-equiprobably signaling that reduces the transmitted signal power and thereby yields a coding gain of 0.7–0.9 dB. The precoder implements decision feedback equalization at the transmitter in a way that creates a valid signal for the Viterbi subset decoder at the receiver. Finally, an intelligent choice of the pre-emphasis filter reduces the transmitted signal power at the low frequencies and hence, the level of non-linear harmonics in the network echo is reduced for a higher level of cancellation.

In the receiver, after demodulation, the baseband signal is subjected to timing recovery, carrier recovery, fractionally-spaced equalization, followed by the Viterbi decoder which decodes the 4D codes of Wei. The Viterbi subset decoder is the most computationally expensive block in the receiver, and the complexity depends on the 16, 32, or 64 state codes being used.

The Viterbi subset decoder (and the equalizer in the self-learning mode) require the knowledge of the closest hard point on a constellation. When precoding is enabled there is constellation expansion, and the point slicing method, which yields the closest hard point on the constellation, assumes that the hard points lie on the infinite lattice. See M. V. Eyuboglu, "Flexible Precoding for V. FAST," Int. Conf. on Data Transmission—Advances in Modem and ISDN Technology and Applications, 1992, Vol. 356, Ch.26, No.356, pp.13–18, and also G. D. Forney, Jr., "Advances in Modem Technology since V.32/ V.32bis," Int. Conf. on Data Transmission —Advances in Modem and ISDN Technology and Applications, 1992, Vol.356, Ch.26, No.356, pp.1–6. A common method for determining the hard points is the Infinite Point Slicing (IPS) method which has a simple implementation. When the constellation expansion is high compared to the constellation size, the distance between the constellation points is effectively reduced in order to maintain the constant transmitted signal power. Therefore, the precoding is disabled in this case, which can result in inter-symbol interference (ISI) caused by severely distorted channels. Consequently, the point slicing method must yield hard points from the particular finite size constellation used in the transmitter of the remote modem and be capable of distinguishing the symbols from one another to yield the correct hard point from among the hard points in the finite size constellation.

Presently, there are no computationally efficient methods for yielding hard points in a 4-quadrant finite constellation that is generalized for all constellation configurations in the V.34 modem standard. The IPS is a computationally efficient method, however, it generates erroneous hard points when it is necessary to consider the constellation boundary. The necessity for a method that does not generate erroneous hard points when it is necessary to consider the constellation boundary is stated in Wei.

In at least one previous work, Martinez, K., Mack, G., "Viterbi Decoder for Wireline Modems," U.S. Pat. No. 4,709,377, (1985), a point slicing method was presented. In that work, the QAM constellation that was assumed is not general in the sense that it has a rectangular shape in the first quadrant. The received soft points are therefore translated into the first quadrant, the nearest hard point is found in the first quadrant, then the hard point is reflected into the quadrant of its corresponding soft point. Due to the rectangular nature of the constellation boundary, the bounds of the perimeter in the first quadrant are straight lines, and the soft points outside this perimeter are shifted inside the perimeter by truncating the real or imaginary parts.

SUMMARY OF THE INVENTION

The present invention addresses and solves the problems of selecting erroneous hard points found in the prior art by determining a valid hard point constellation and projecting received external soft points into the constellation boundary to locate the closest valid hard point. The present invention provides a point slicing method for digital transmission based on QAM (Quadrature Amplitude Modulation) constellations. Upon receiving noisy constellation points at the equalizer output, such as shown in FIG. 3 for the V.34 modem, the proposed method obtains the closest valid constellation hard point in each subset. The computational complexity of the proposed method is nearly independent of the constellation size. The present invention finite point slicing (FPS) method is based on modifying the IPS method and conducting a search over a maximum of nine candidate hard points, when necessary. The invention FPS method does not generate erroneous hard points when it is necessary to consider the constellation boundary. This invention pertains to the receiver section of a modem used in data communications, and/or particularly, to a receiver incorporating a Viterbi decoder without the need for special processors dedicated for trellis decoding.

The present invention is a computer method and apparatus of point slicing in digital communication systems employing QAM having a defined number of bits per symbol, wherein the number of bits per symbol defines a QAM hard point constellation. The invention method comprises the steps of (i) providing an infinite lattice having a coordinate system and an origin and having at least one subset of QAM constellation hard points, (ii) receiving at least one subset of soft points where these soft points spatially map onto the infinite lattice, (iii) defining at least one valid constellation boundary where this boundary defines a set of valid constellation hard. points, (iv) determining a closest valid constellation hard point for each received soft point, and (v) reporting the closest valid constellation hard point.

The invention method for determining a closest valid constellation hard point comprises the steps of (i) defining at least one valid constellation boundary for selecting a finite constellation of hard points from the infinite hard point constellation, and (ii) the step of determining a closest valid constellation hard point comprises the steps of selecting from the received soft points multiple subsets of soft points including a first subset of soft points, locating a closest valid finite constellation hard point to each soft point in said first subset of soft points, and locating a closest valid finite constellation hard point for each soft point in all other subsets of soft points. The step of locating a closest valid constellation hard point includes the steps of (i) comparing each soft point location with the finite constellation boundary, (ii) locating a closest hard point for each interior soft point, and (iii) locating a closest hard point for each exterior soft point. The step of locating a closest hard point for each exterior soft point further comprises the steps of (i) projecting each exterior soft point along an imaginary line connecting to the constellation origin to get an associated intermediate soft point for each exterior soft point, and (ii) locating a closest intermediate hard point for each intermediate soft point, and (iii) searching all hard points surrounding and including said closest intermediate hard point for each intermediate soft point, where the final hard point is a member of the valid finite constellation hard points. Projecting each exterior soft point comprises the steps of defining a plurality of distant ratios, and multiplying each exterior soft point coordinates by corresponding distance ratios to project the exterior soft point inside of and including onto the finite constellation boundary. Defining a plurality of distance ratios includes computing the equation:

$$(I_s^p, Q_s^p) = \frac{d_{\max} - \epsilon}{d(I_s, Q_s)} \times (I_s, Q_s).$$

Selecting a finite constellating boundary comprises the step of defining a geometric shape about the constellation origin to determine a spacial boundary about the constellation origin. Selecting a finite boundary comprises the step of passing the geometric shape through the finite constellation hard point located farthest from the constellating origin. Finally, locating the valid finite constellation hard points for each soft points in all other subsets of soft points comprises the steps of performing a soft point coordinate system transformation with each subset coordinate system to the first subset coordinate system, locating a closest valid finite constellation hard point to each soft point in each subset from among the hard points in the first subset coordinate system, and performing a hard point coordinate system transformation to map each located closest hard with each soft point subset into the subset original coordinate system.

The invention apparatus is a digital communication device for receiving QAM signals that employs a decoder for decoding received soft points into corresponding hard points in a QAM constellation. The invention apparatus comprises (i) a signal processor, (ii) a QAM constellation boundary routine to define a set of valid QAM constellation hard points, and (iii) a finite point slicing routine operating on the signal processor that locates corresponding valid QAM constellation hard points for the received soft points.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 is a table comparing the computational complexities of the IPS and FPS methods and Exhaustive Search (ES) in MFLOPS for various constellation sizes and Signal-to-Noise Ratios (SNRs).

DETAILED DESCRIPTION OF THE INVENTION

Figure 1:
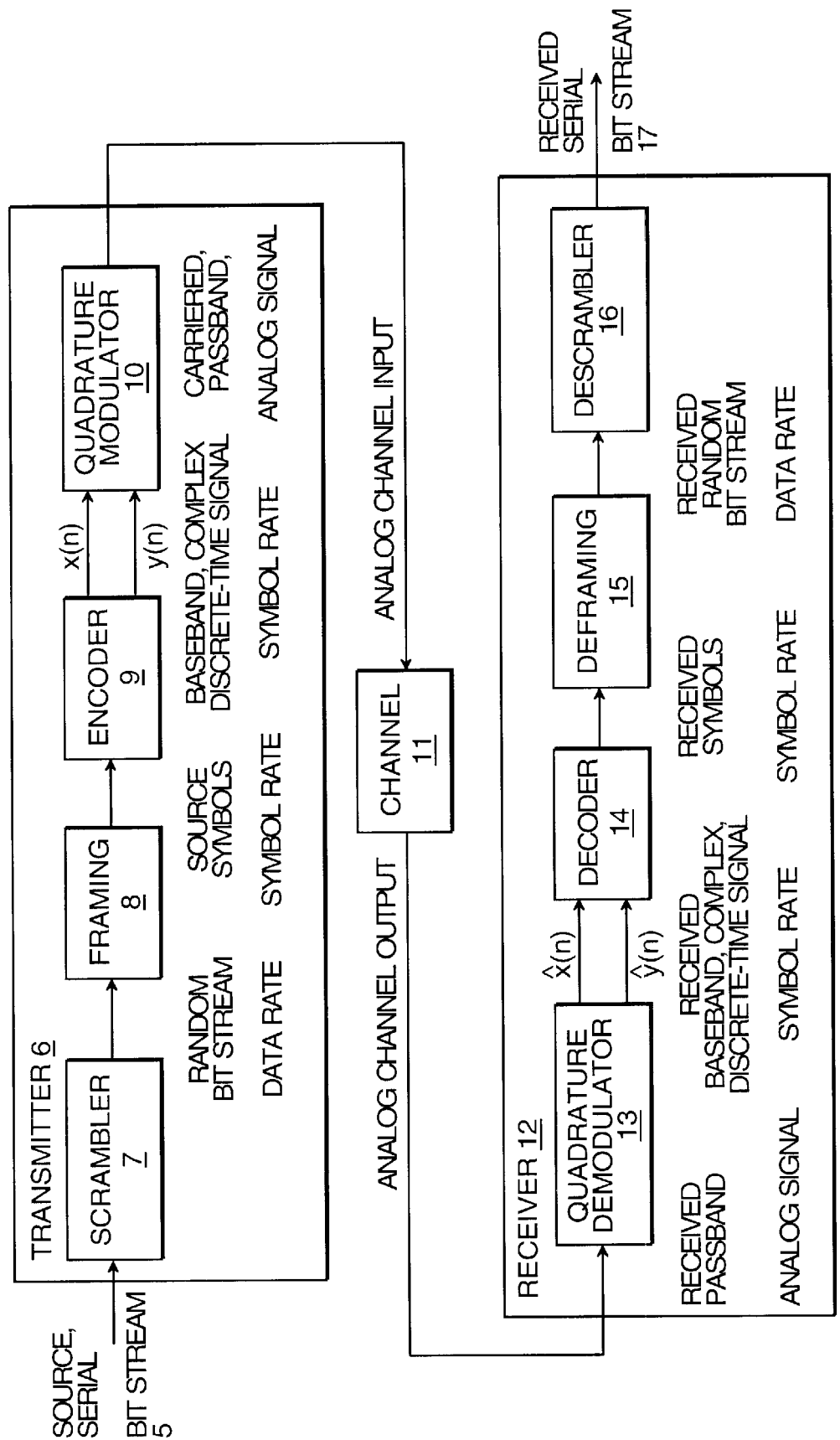
FIG. 1 is a block diagram of a modem communication system having a transmitter and receiver.

The present invention method and apparatus are used in the area of QAM constellation decoding. The invention method lends itself to a microprocessor based modem system as shown in FIG. 1.

Briefly, the illustrated modem system has a transmitter 6 and a receiver 12 communicating across an analog channel 11. A source bit stream 5 is received by a scrambler 7 of transmitter 6. The scrambler 7 generates a random bit stream from the source serial bit stream 5. The generated random bit stream is at a data rate and is received by a framing unit 8 of the transmitter 6. The framing unit 8 preprocesses the random bit stream into source symbols for encoder 9. In turn, encoder 9 generates baseband, complex, discrete-time signal [x(n), y(n)] at the same symbol rate as the source symbols from framing unit 8. The generated baseband, complex, discrete-time signal [x(n), y(n)] is modulated by a quadrature modulator 10 into carriered, passband analog signals.

The carriered, passband analog signal is output by quadrature modulator 10 of transmitter 6 onto analog channel 11. In a typical analog channel 11, signal-to-noise ratio reducing effects are imparted onto the analog signal between an analog channel input and an analog channel output. The analog channel output is electrically connected to receiver 12, thereby coupling quadrature modulator 10 of transmitter 6 to quadrature demodulator 13 of receiver 12.

Receiver 1 demodulates, decodes, deframes, and descrambles the analog signals to produce a serial bit stream 17 corresponding to source serial bit stream 5 as follows. Quadrature demodulator 13 converts a received, passband, analog signal into a corresponding [x'(n), y'(n)] received, baseband, complex, discrete-time signal having a symbol rate equivalent to the symbol rate of the quadrature modulator 10 input signal [x(n), y(n)]. Decoder 14 performs an inverse operation from encoder 9 of transmitter 6, resulting in received symbols having the same symbol rate being presented to a deframing unit 15. Deframing unit 15 converts the received symbols into a received, random, bit stream having a data rate equivalent to the random bit stream data rate output by the scrambler unit 7 of transmitter 6. The deframed, random, bit stream is then descrambled by descrambler unit 16 into a corresponding, received, serial, bit stream 17 corresponding to the serial bit stream 5 presented to transmitter 6.

Figure 2:
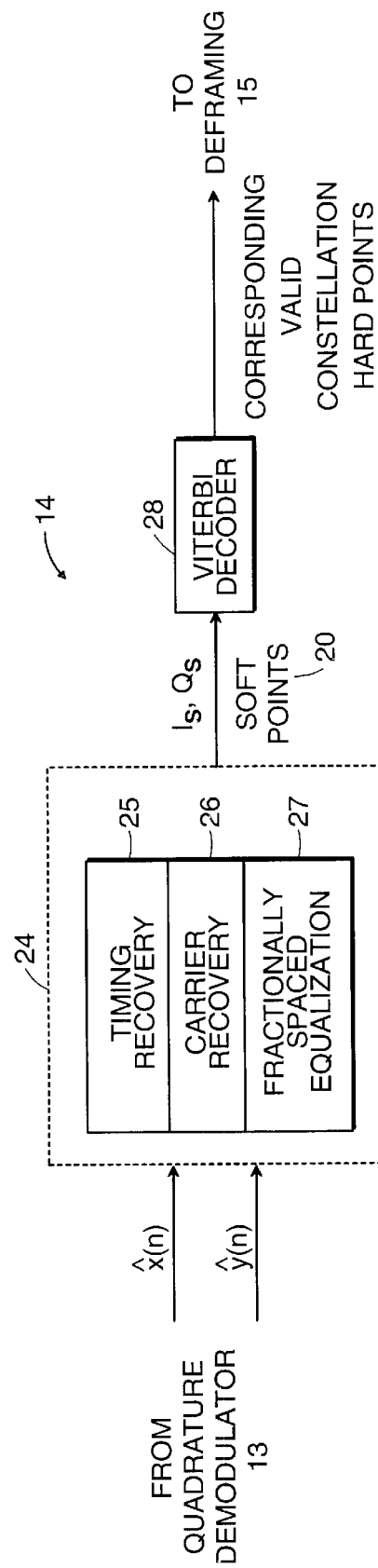
FIG. 2 is a schematic overview of the modem system receiver utilizing a Viterbi decoder.

Preferably, decoder 14 employs a recovery/equalizer assembly 24 and a Viterbi decoder 28, shown in FIG. 2. The received baseband, complex, discrete-time signal [x'(n), y'(n)] at a symbol rate output from the quadrature demodulator 13 in receiver 12 is received by the recovery/equalizer assembly 24. Inside the recovery/equalizer assembly 24 is a timing recovery unit 25, a carrier recovery unit 26, and a fractionally spaced equalization unit 27. The relationships among the timing recovery unit 25, carrier recovery unit 26, and fractionally spaced equalization unit 27—and the operations of these units—is well known in the art to convert the baseband signal [x'(n), y'(n)], which is also referred to as (I, Q), into the soft points $(I_s, Q_s)$ 20. Soft points $(I_s, Q_s)$ 20 are presented to a Viterbi decoder 28. In the response, the Viterbi decoder 28 locates valid constellation hard points corresponding to the received soft points $(I_s, Q_s)$. The resulting valid constellation hard points represent received symbols at a symbol rate that are output to a deframing unit 15. This invention will be discussed in relation to the Viterbi decoder 28 portion of FIG. 2.

In the Viterbi decoder 28, there is a need to determine the Euclidean distance of a received soft point to an associated hard point on the QAM constellation. Finding the hard point is known as "point slicing" in the art. Point slicing is traditionally performed using either an infinite point slicing method or a finite point slicing method. The present invention takes advantage of and uniquely combines both types of point slicing methods.

Figure 3:
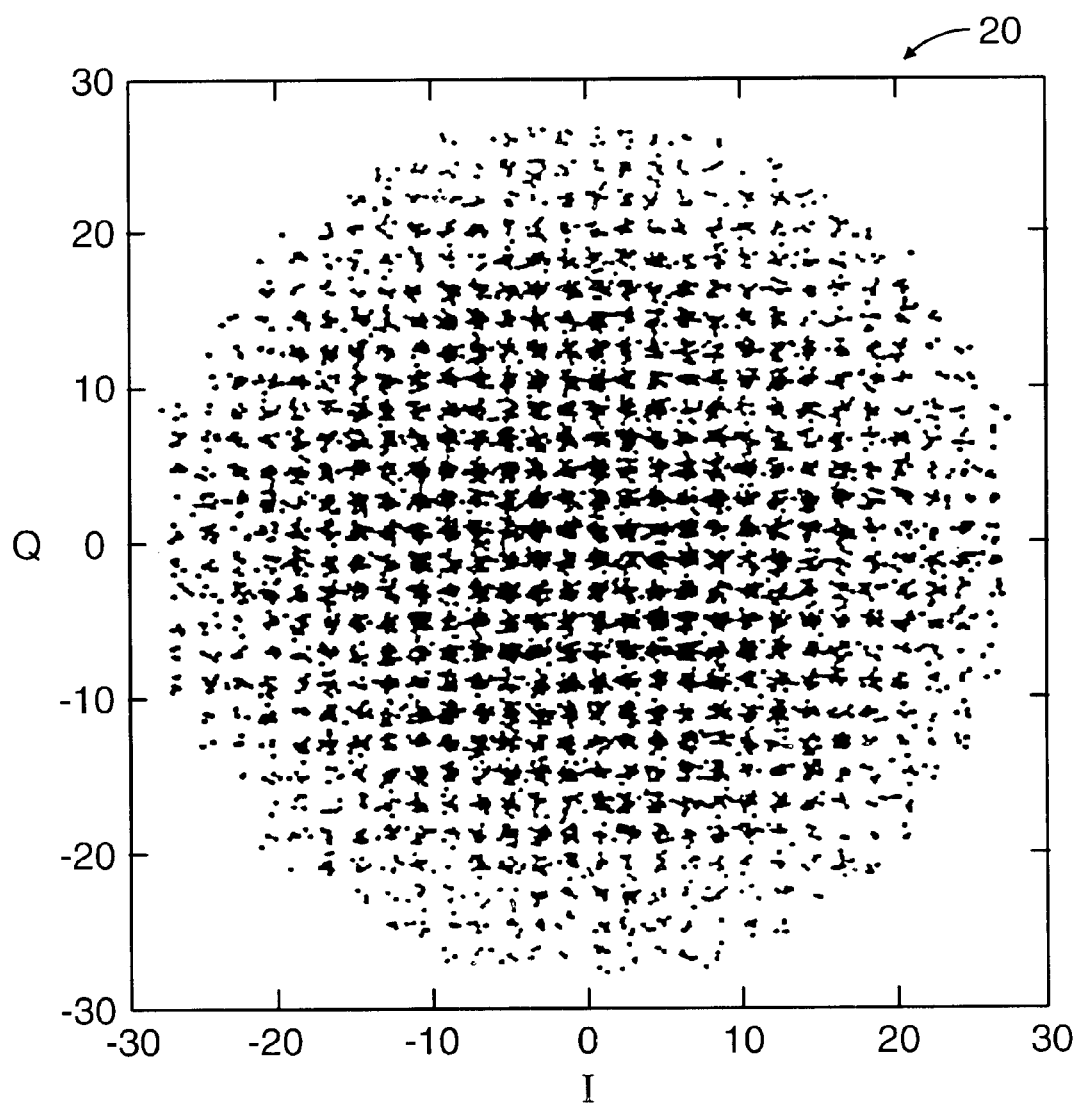
FIG. 3 is an illustration of a received signal constellation diagram for 28.8 kbps, 3,429 symbols/seconds V.34 modem at the equalizer output at 31 dBSNR.

In particular, noisy (or "soft") constellation points 20 are output from equalizer assembly 24 as illustrated in FIG. 3 for the V.34 modem. The present invention method receives the noisy constellation points 20 and, in response, obtains the closest valid constellation hard point in each subset. The computational complexity of the present invention method is nearly independent of the constellation size. The invention finite point slicing (FPS) method is based on modifying the IPS (Infinite Point Slicing) method, and conducting a search over a maximum of nine candidate hard points, when necessary.

Figure 4:
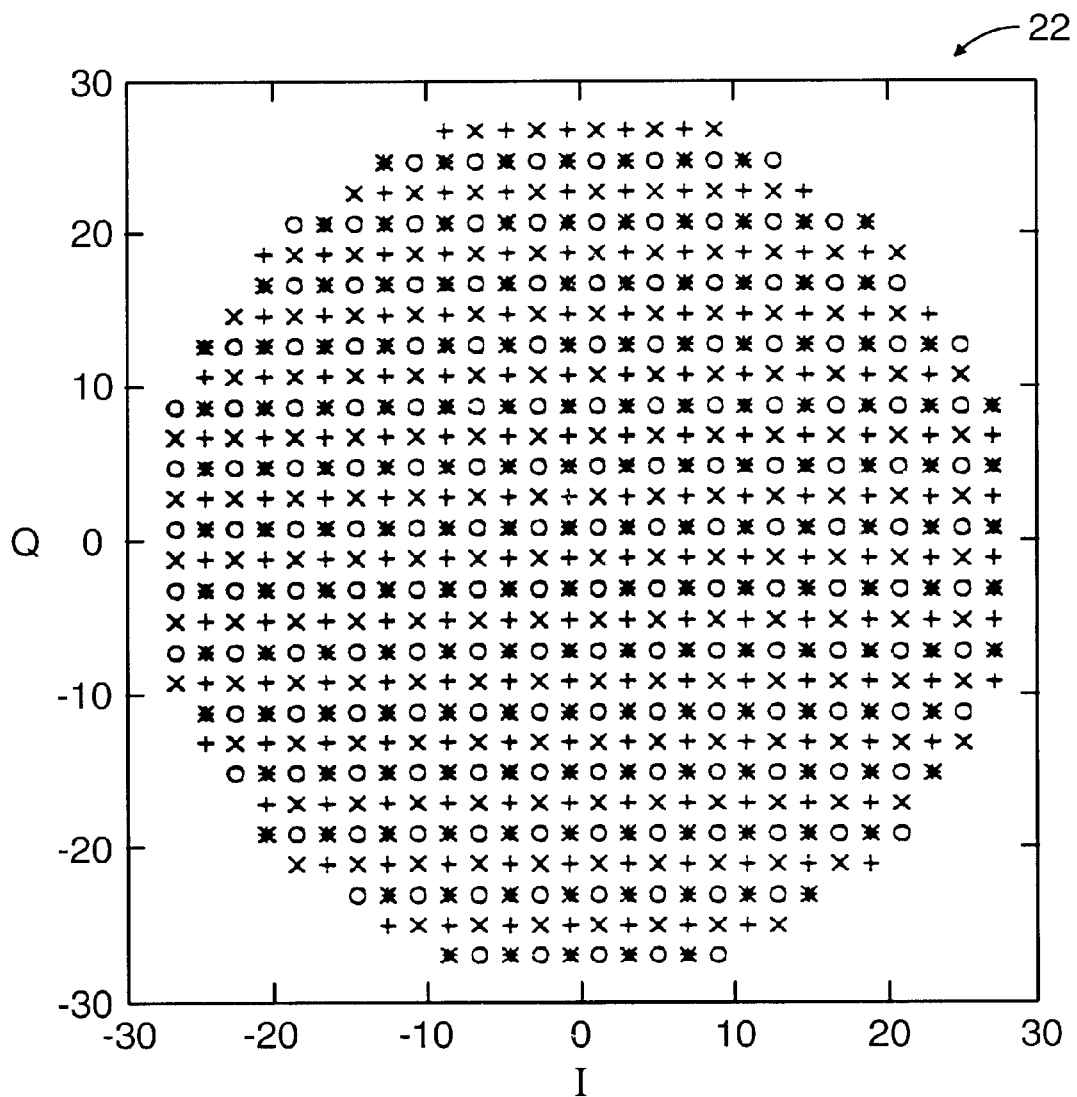
FIG. 4 shows a lattice partitioned into working subsets according to the present invention.

For the V.34 modem standard, the present invention partitions infinite lattice $Z^2$ (hard points) 22 into four subsets, $S_i$, i=0, 1, 2, 3, as shown in FIG. 4. Subset $S_0$ is shown as the set of points marked 'o'. Subset $S_1$ is the set of points marked 'x'. Subset $S_2$ is the set of points marked '+', and subset $S_3$ is the set of points marked '*'.

The subsets, $S_1$, $S_2$, $S_3$, are 90°, 180°, 270° clockwise rotations of $S_0$ as defined by the ITU. See Wei and ITU Recommendation V.34, prior mentioned.

For a given soft (noisy) point $(I_s, Q_s)$, assuming an infinite size constellation, the IPS method determines the closest hard point $(I_h, Q_h) \in S_0$ as follows:

Step 1. Subtract the offset (1,1) from $(I_s, Q_s)$.

Step 2. Round the result of Step 1 to the nearest integer multiple of 4.

Step 3. Shift the result of Step 2 back by (1,1) to obtain $(I_h, Q_h)$.

The closest hard points in other subsets may be determined in various ways. For instance, soft points are rotated counter clockwise onto $S_0$. This is followed by determining the closest hard point in $(I_h, Q_h) \in S_0$. Finally, this point is rotated back onto the appropriate subset by rotating clockwise. Another technique is as follows: Once $(I_h, Q_h)$ is determined, then a small search is conducted over the neighboring valid hard points that are in other subsets. Hence, the key is to determine $(I_h, Q_h) \in S_0$, which is the focus of this invention.

Note that, in other modem standards, such as in the V.32, the subset may not be rotationally invariant. However, the method in this invention is general enough and may be used in these cases with minor modifications, such as keeping a record of the constellation points lying on the subset boundary for each subset.

Figure 5:
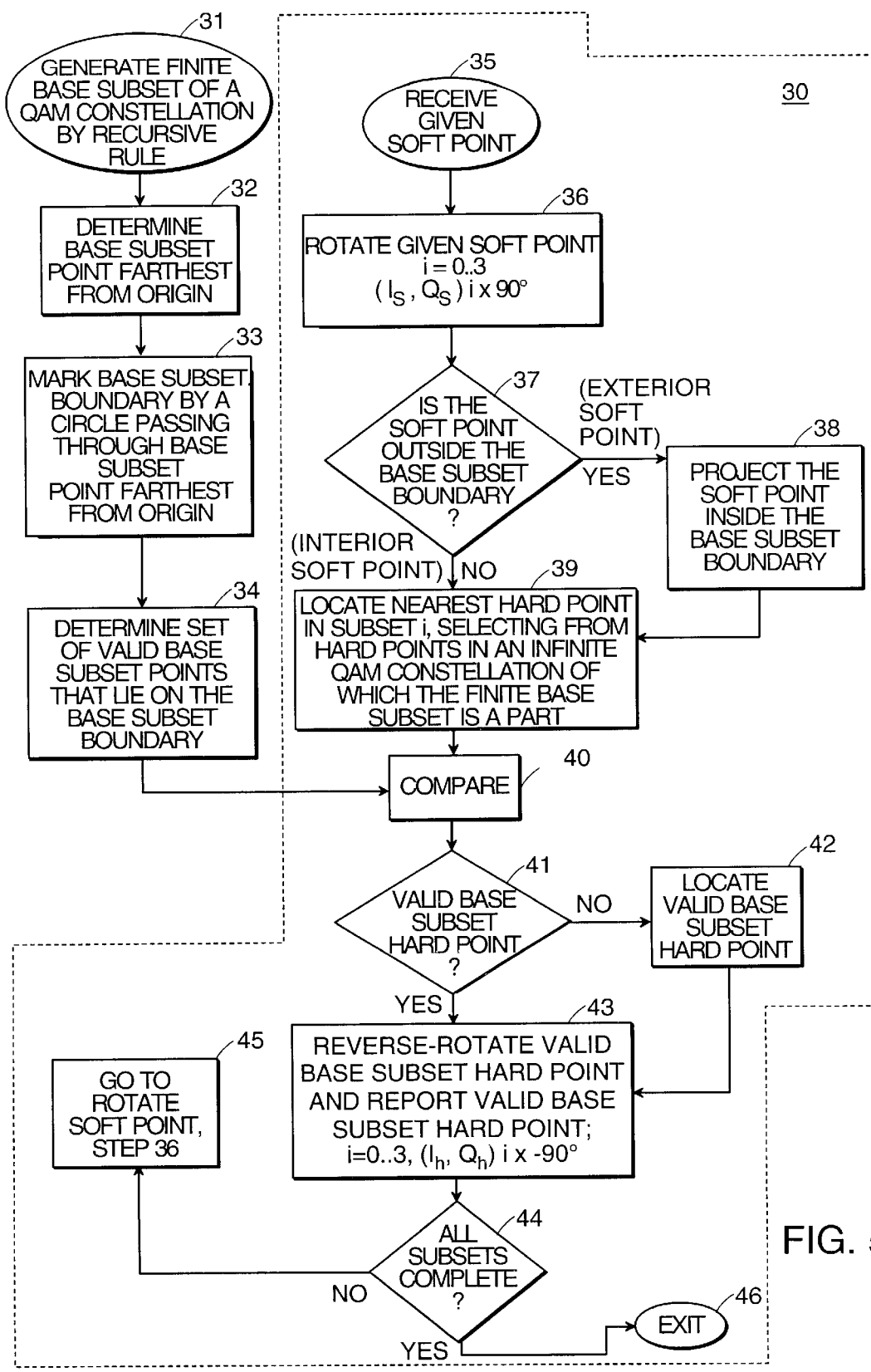
FIG. 5 is a block diagram showing the preferred embodiment of the present invention.

The FPS method of the current invention is as follows. Let the finite subsets of interest be denoted by $S_i^f \supset S_j$. In the V.34 modem standard stated previously, the constellation points in $S_0$ are generated recursively as follows. Signal constellations consist of complex-valued signal points which lie on a two-dimensional rectangular grid. All signal constellations used in the ITU Recommendation V.34 are subsets of a 1664-point superconstellation. FIG. 5 of the ITU Recommendation V.34 shows one-quarter of the points in the superconstellation, where the points are labeled with decimal integers between 0 and 415. The point with the smallest magnitude is labeled as 0. The point with the next larger magnitude is labeled as 1, and so on. When two or more points have the same magnitude, the point with the largest imaginary component is taken first. The full superconstellation is the union of the four quarter-constellations obtained by rotating the constellation in FIG. 5 of the ITU Recommendation V.34 by 0, 90, 180, and 270 degrees. It is thus easy to find the set of constellation points with the largest distance, $d_{max}$, to the origin for any given constellation size. Let the set of these points be:

$$D_{max} = \{(I, Q): (I, Q) \in S_0, d(I, Q) = d_{max}\}$$

then, one can write:

$$S_0^f = \{(I, Q): (I, Q) \in S_0, d(I, Q) \leq d_{max}\}.$$

The invention FPS method determines the closest element in $S_0^f$ by letting $(I_h, Q_h)$ be the hard points obtained from the IPS method:

Step 1. If
$d(I_s, Q_s) \leq d_{max}$ and $(I_h, Q_h) \in S_0^f$,
then no further operations are necessary.

Step 2. If
$d(I_s, Q_s) \leq d_{max}$ but $d(I_h, Q_h) \geq d_{max}$,
then $(I_h, Q_h)$ is lying on or immediately outside the constellation boundary. Firstly, find the valid hard points around and including $(I_h, Q_h)$ that are in $S_0^f$ by checking against the elements in $D_{max}$. Then, perform a search over these points to find the closest valid hard point.

Step 3. If
$d(I_s, Q_s) > d_{max}$,
then the closest hard point in $S_0^f$ is found as follows. First, the soft point $(I_s, Q_s)$ is projected along the line connecting to the origin to create an intermediate soft point $(I_s^P, Q_s^P)$ such that $$(I_s^P, Q_s^P) = \frac{d_{max} - \epsilon}{d(I_s, Q_s)} \times (I_s, Q_s),$$

where $\epsilon$ is a small positive real number. This projection is such that $d(I_s^P, Q_s^P) < d_{max}$. Then, the IPS method is used to find the hard point $(I_h^P, Q_h^P)$. The result may be $d(I_h^P, Q_h^P) <$ or $=$ or $> d_{max}$. Note also that $(I_h^P, Q_h^P)$ is not necessarily the closest point to $(I_s, Q_s)$ or a valid point in $S_0^f$. Therefore, in this invention, the closest point corresponding to a given soft point in this case is found by using a search over 9 points around and including $(I_h^P, Q_h^P)$, and by constraining the method to the valid points in $S_0^f$ only. The operations performed for this case are illustrated in FIG. 7.

Figure 7:
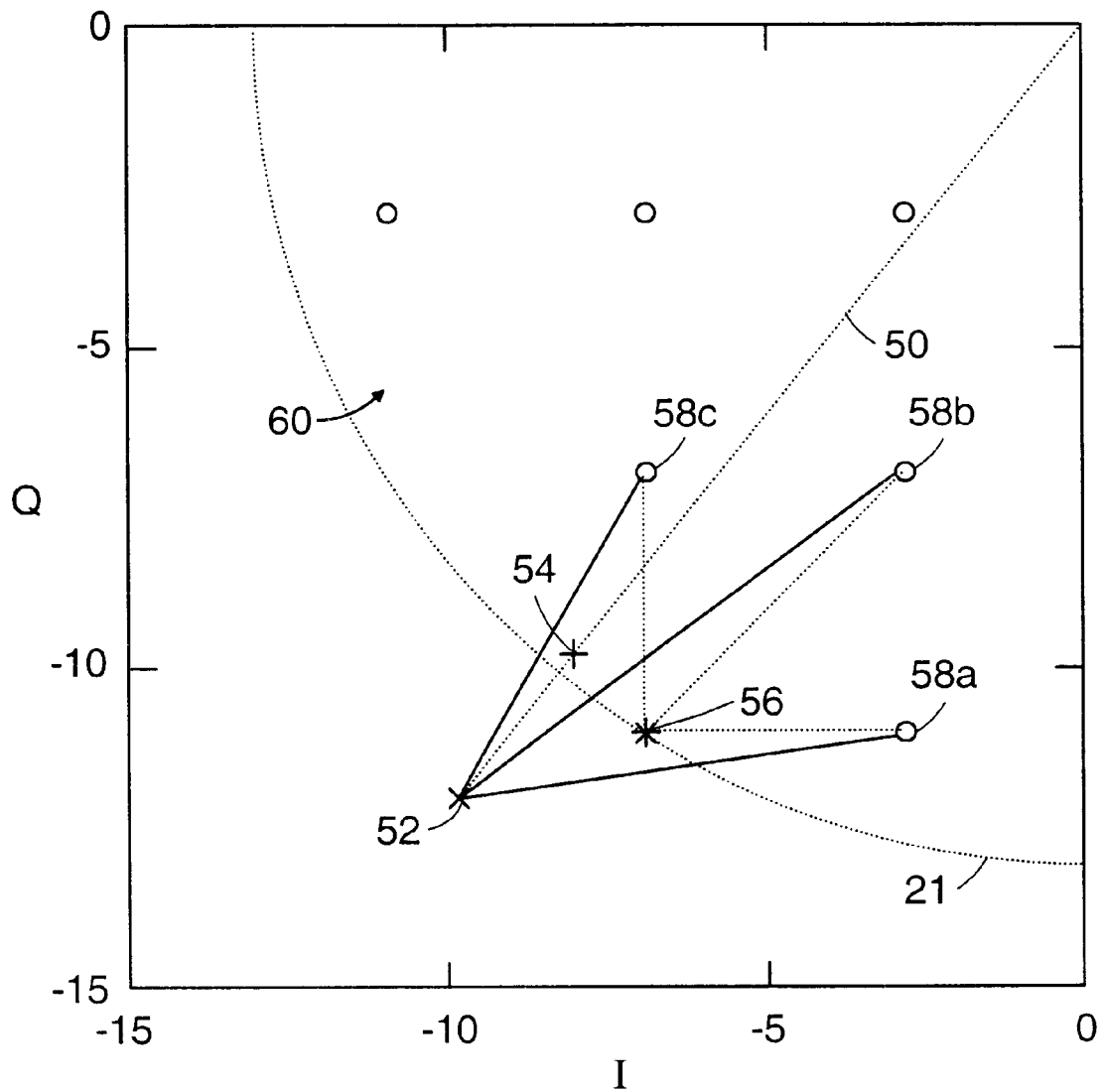
FIG. 7 is an example of the present invention acting on a received exterior soft point.

Referring to FIG. 7, shown is a graph where $(I_s, Q_s)$ 52 and $(I_s^P, Q_s^P)$ 54 are respectively denoted by 'x' and '+'. On applying IPS, the point $(I_h^P, Q_h^P)$ 56 denoted by '*' is found on the constellation boundary 21, but it is not a valid hard point. Therefore, the soft point is first projected inside the constellation boundary 21 to get $(I_s^P, Q_s^P)$ 54. A local search over valid hard points 58a, 58b, 58c is then conducted and the closest hard point 58c to the original soft point 52 is returned.

The above method for projecting soft points located exterior of the constellation boundary 21 is the preferred method for this invention. However, there may be other methods of projecting the exterior soft point 52 into the constellation boundary 21 that result in finding the correct corresponding valid hard point. It should be noted that the current invention differs from the method of Martinez et. al., U.S. Pat. No. 4,709,377 in that the projection of the current invention is unlike the truncation method of the real or imaginary parts of the soft points in the prior art reference.

The quarter superconstellation 60 mentioned above coincides with $S_o$ of the 4D Viterbi decoder used at the receiver. The Viterbi decoder requires the distance of a soft point to the closest hard point in each subset. There are four basic subsets from which the multidimensional subsets are formed by grouping. Therefore, the closest hard point in other subsets are required. In the preferred embodiment of the current invention, the closest hard point in other subsets are found by rotating the received soft point counter clockwise onto other subsets and repeating the same procedure. The hard points obtained this way can then be rotated clockwise to get the closest hard point in other subsets.

FIG. 5 shows a block diagram of the preferred embodiment of the invention. A QAM constellation is generated by the recursive rule, seen in Block 31 earlier described. Note this generated, generalized, QAM constellation is not rectangular, unlike Martinez et. al., U.S. Pat. No. 4,709,377 previously discussed. After that, a determination of the constellation point farthest from the origin is made, as seen in Block 32. In the preferred embodiment, this constellation point is on the $S_o$ quarter superconstellation. A constellation boundary is passed through this constellation point farthest from the origin, Block 33, where this constellation boundary represents the boundary of the valid constellation points in the finite QAM constellation. Finally, before the operation of the modem begins, a determination is made to find the set of constellation hard points that lie on the boundary, Block 34. Due to the asymmetric nature of the quarter superconstellation in the four quadrants, not all the points inside the above mentioned circle are valid constellation points for a given constellation size. Soft points that map to the invalid points, as discussed later, will be processed by the previously discussed method of searching nine constellation hard points.

Continuing with FIG. 5, in the preferred embodiment, the modem receives one or more subsets of soft points, Block 35. Next, in Block 36, each soft point subset $(I_s, Q_s)$ is rotated by its index number times 90°. That is, for subset zero, the subset is not rotated. For subset one, the subset is rotated 90°. For subset two, the subset is rotated by 180°. For subset three, the subset is rotated by 270°. Block 37 is a decision junction of whether the soft point is outside the constellation boundary. If the soft point is outside the constellation boundary, then an exterior soft point has been received, and, in Block 38, the soft point is projected inside the constellation boundary. If the soft point is on or inside the constellation boundary, Block 37, then the method prescribes locating the nearest hard point, Block 39. For exterior soft points that have been projected to intermediate hard points, Block 38, locating the nearest hard point, Block 39, is performed from the intermediate soft point. Next, a comparison is made of the located nearest hard point with the set of invalid constellation hard points, (i.e., the constellation hard points found to lie on the valid constellation hard point boundary, other than the farthest hard point from the origin). This comparison is Block 40. In Block 41, the determination is made, based on the comparison, as to whether a valid hard point has been found. If a valid hard point has not been found, then the next step in this method is to locate the nearest valid hard point, Block 42. Preferably, this is accomplished by searching the eight surrounding hard points and the located hard point to find the hard point with the closest Euclidean distance from the received soft point. If the answer to Block 41 is yes, then this located valid hard point is returned, Block 43.

The foregoing is repeated for each point in each subset received. This is illustrated by the decision Block 44. If all subsets have not been run through the FPS method, then the method repeats, Block 45. Once all subsets are complete, then the FPS method is complete, and the modem proceeds to its next step, Block 46. Blocks 35–46 can be considered a filter 30 for slicing soft ("noisy") points into hard points.

Figure 6:
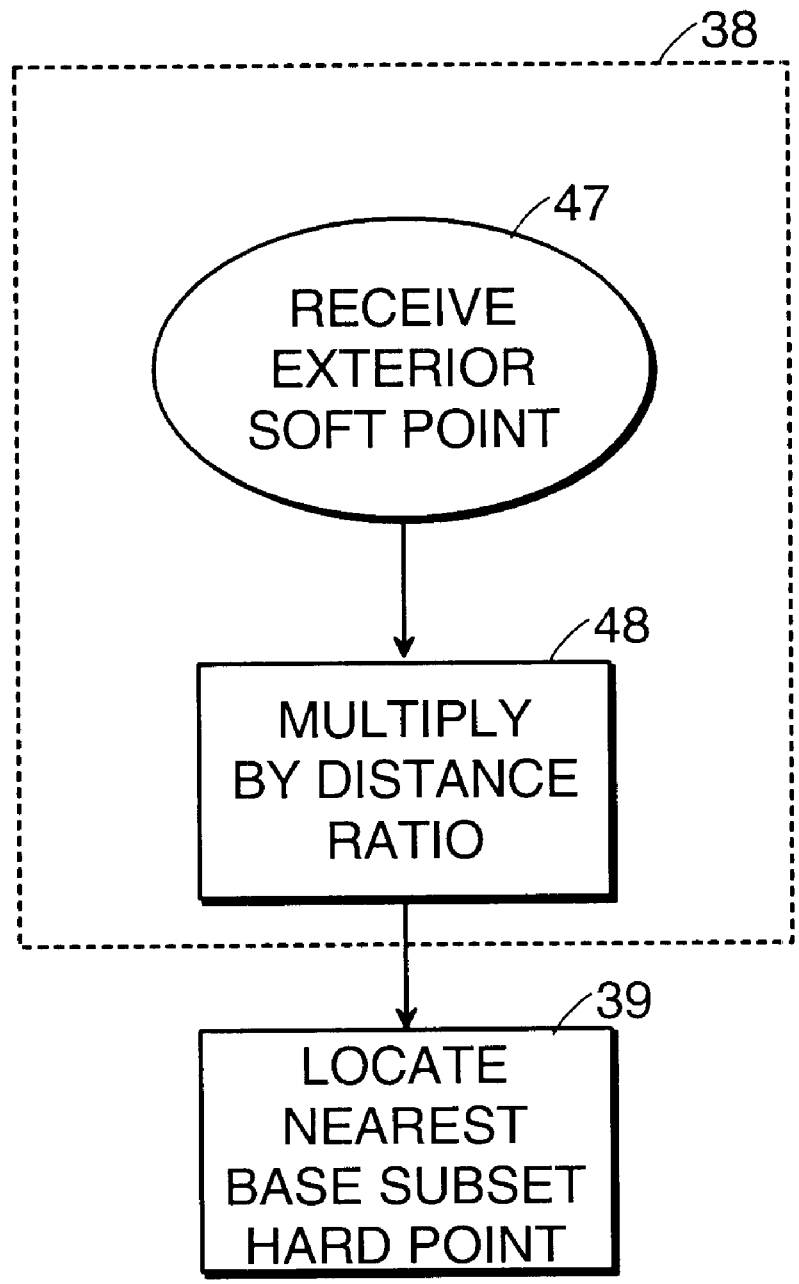
FIG. 6 is a block diagram showing a projection procedure used by an embodiment of the invention.

FIG. 6 further defines the step of projecting the soft point inside the constellation boundary, FIG. 5 Block 38. After receiving an exterior soft point Block 47 from decision Block 37, the received exterior soft point is multiplied by a distance ratio, Block 48. In the preferred embodiment, the distance ratio in Block 48 is the premultiplication term discussed in the projection equation of FPS method Step 3 above (in the event the comparison operation using the relational operator, >, results in a TRUE condition). The product from the distance ratio multiplication Block 48 is the projected soft point, which is returned for locating a nearest hard point Block 39.

Figure 8:
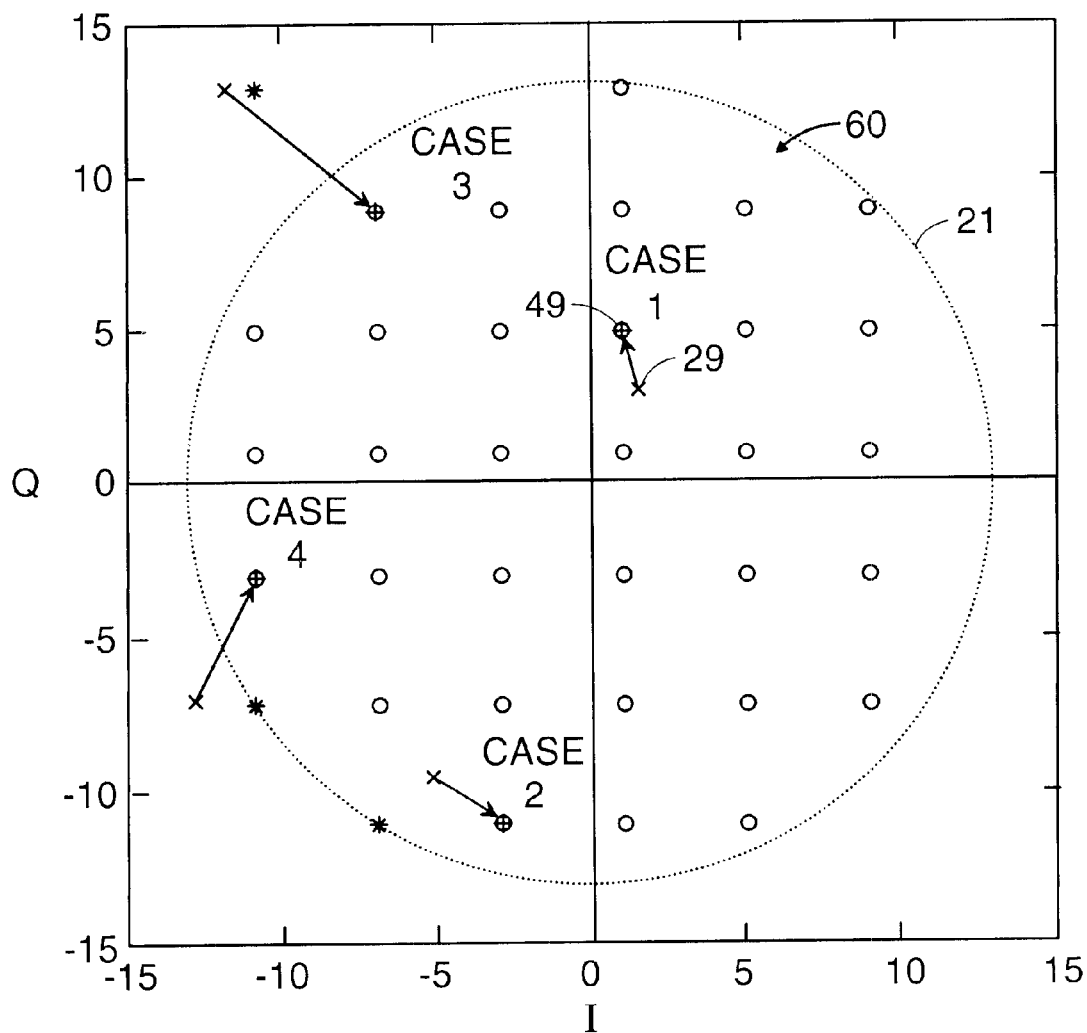
FIG. 8 shows various examples of the operation of the present invention FPS method.

Examples for various cases in applying the above method are illustrated in FIG. 8 for $S_0^f$ (i.e., valid, finite subset zero, hard points 60) corresponding to a 256-point V.34 modem constellation. In each case, the result of the invention FPS method and the soft point are connected by a line. The result given by the prior art IPS method is marked by '*'. Note how the prior art IPS method fails to slice the soft points onto valid subset points 60 in cases 2, 3, and 4.

Specifically, referring to FIG. 8, Case 1 shows a received soft point 29 falling inside the constellation boundary 21. The corresponding hard point 49 is located without difficulty using only the steps of an IPS method. In Case 2, the IPS method locates an invalid constellation hard point located on the boundary, then the additional steps in the FPS method of the current invention locate the nearest valid hard point. In Case 3, the soft point is external to the constellation boundary, and the IPS method locates an invalid hard point on the infinite hard point constellation that is outside the finite point constellation boundary. The FPS method of the current invention proceeds to locate a valid hard point inside the finite hard point constellation. In Case 4, the soft point is again located outside the finite point constellation boundary, and here the first point located by the IPS method is an invalid hard point that is located on the finite hard point constellation boundary. The invention FPS method continues on with a search over the nearest hard points of the valid hard point constellation and returns a valid hard point located inside the finite hard point constellation. Note that because the invention FPS method does not perform an exhaustive search over every hard point in the constellation, there is significant time savings as the number of hard points increases, as seen in FIG. 9.

The computational complexities IPS and FPS methods for slicing soft points into $S_o^f$ are compared for the V.34 model standard for various constellation sizes and at a number of SNR levels in FIG. 9. The average number of floating-point operations (FLOPS) performed per second are tabulated in FIG. 9. The complexity of the invention FPS method is about twice the complexity of the prior art IPS method, and it is nearly independent of the constellation size. Note that the probability of having soft points outside the constellation boundary is smaller for larger constellations, and hence the invention method works as the IPS method for most soft points. The IPS method has lower complexity, but the invention method makes erroneous decisions on the closest hard point when the soft points are outside the constellation boundary. The computational complexity of using exhaustive search over a constellation is also included in FIG. 9. It is clear that using the exhaustive search approach is not feasible for large constellations that are necessary for high data rates.

The present invention is a computationally efficient method that is presented for slicing soft points into finite subsets, which is general enough to be used for all constellation configurations in the V.34 modem standard. The complexity of this method is about twice the complexity of the method that assumes infinite subsets.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A computer method of point slicing in digital communication systems employing Quadrature Amplitude Modulation (QAM) having a defined number of bits per symbol, wherein said number of bits per symbol defines a QAM hard point constellation, the method comprising the steps of:

providing an infinite lattice, wherein said infinite lattice is spatially defined by a coordinate system having an origin located at the intersection of two or more axes, said infinite lattice comprising at least one subset of said QAM constellation hard points;

receiving at least one subset of soft points, said soft points spatially mapping into said infinite lattice;

defining at least one valid constellation boundary, said valid constellation boundary defining a set of valid constellation hard points, wherein said set of valid constellation hard points is a subset of said QAM hard point constellation, said valid constellation boundary having a constellation origin;

determining a closest valid constellation hard point for each soft point in said subsets of soft points; and reporting said closest valid constellation hard point.

2. The method of claim 1 wherein determining a closest valid constellation hard point comprises the steps of:

the step of defining at least one valid constellation boundary includes selecting a finite constellation boundary about said constellation origin, said finite constellation boundary distinguishing a finite constellation of hard points from said infinite hard point constellation, said finite hard point constellation enclosed by said finite constellation boundary comprising a plurality of valid finite constellation hard points; and the step of determining a closest valid constellation hard point comprising the steps of:

selecting from the received soft points multiple subsets of soft points including a first subset of soft points;

locating a closest valid finite constellation hard point to each soft point in said first subset of soft points; and locating a closest valid finite constellation hard point for each soft point in all other subsets of soft points.

3. The method according to claim 2 wherein the step of locating a closest valid constellation hard point includes the steps of:

comparing each soft point location with the finite constellation boundary, said soft points located outside said finite constellation boundary defining at least one exterior soft point, said soft points located on or inside said constellation boundary defining at least one interior soft point;

locating a closest hard point for each interior soft point, said closest hard point selected from said finite hard point constellation; and locating a closest hard point for each exterior soft point, said closest hard point selected from said finite hard point constellation.

4. The method of claim 3 wherein locating a closest hard point for each exterior soft point further comprises the steps of:

projecting each exterior soft point along an imaginary line connecting to the constellation origin to get an associated intermediate soft point for each exterior soft point, said intermediate soft points located within said finite constellation boundary;

locating a closest intermediate hard point for each intermediate soft point; and searching all hard points surrounding and including said closest intermediate hard point for each intermediate soft point, said searching determining a hard point being a member of said valid finite constellation hard points and being located closest to said exterior soft point associated with said closest intermediate hard point.

5. The method of claim 4 wherein projecting each exterior soft point comprises the steps of:

defining a plurality of distance ratios, each of said distance ratios corresponding with an individual exterior soft point and being defined by a largest distance from said constellation origin of any of said hard points in said finite hard point constellation and the distance of said exterior soft point from said constellation origin, each said distance ratio being a scalar value less than one; and multiplying each exterior soft point coordinates by said corresponding distance ratio to project said exterior soft point inside of including onto said finite constellation boundary.

6. The method of claim 5 wherein defining a plurality of distance ratios includes:

for each corresponding exterior soft point, computing $$(I_s^p, Q_s^p) = \frac{d_{\max} - \epsilon}{d(I_s, Q_s)} \times (I_s, Q_s)$$

wherein $(I_s^p, Q_s^p)$ is the coordinate representation of the corresponding exterior soft point being projected, $d_{max}$ is the largest distance to the constellation origin, $\epsilon$ is a small positive real number, $d(I_s, Q_s)$ is the distance from the corresponding exterior soft point to the constellation origin, and $(I_s, Q_s)$ is the coordinate representation of the exterior soft point being projected.

7. The method of claim 2 wherein selecting a finite constellation boundary comprises the step of defining a geometric shape about the constellation origin to determine a spatial boundary about said constellation origin.

8. The method of claim 7 wherein selecting a finite constellation boundary comprises the step of passing said geometric shape through said finite constellation hard point located farthest from said constellation origin as compared to every other finite constellation hard point.

9. The method of claim 2 wherein locating said valid finite constellation hard points for each soft point in all other subsets of soft points comprises the steps of:

performing a soft point coordinate system transformation from each subset coordinate system to said first subset coordinate system;

according to said first subset coordinate system, locating a closest valid finite constellation hard point to each soft point in each subset; and performing a hard point coordinate system transformation to map each located closest hard point associated with each soft point subset into said subset original coordinate system.

10. A digital communication device for receiving quadrature amplitude modulation (QAM) signals that employs a decoder for decoding received soft points into corresponding hard points in a QAM constellation, the communication device comprising:

a signal processor;

a QAM constellation boundary routine executed by the signal processor to define a valid constellation boundary defining a set of valid QAM constellation hard points in an infinite lattice spatially defined by a coordinate system having an origin located at the intersection of at least two axes; and a finite point slicing routine executed by the signal processor that locates corresponding valid QAM constellation hard points for the received soft points.

11. The communication device of claim 10 further comprising a soft point projection routine for projecting received soft points located outside the constellation boundary to an intermediate soft point located inside the QAM constellation boundary, wherein the intermediate soft point is reported to the finite point slicing routine.

12. The communication device of claim 11 wherein the finite point slicing routine further comprises a search routine that performs a search over nine constellation points to locate a closest valid QAM constellation hard point.

13. The digital communication device of claim 10 wherein the finite point slicing routine computational complexity is independent of the constellation size.

14. A computer method of point slicing in digital communication systems employing Quadrature Amplitude Modulation (QAM) having a defined number of bits per symbol, wherein said number of bits per symbol defines a QAM hard point constellation, the point slicing decoding received soft points into corresponding hard points, the method comprising:

generating hard points of a base subset of the QAM constellation in an infinite lattice spatially defined by a coordinate system having an origin located at the intersection of at least two axes, said origin serving as a constellation origin;

defining a subset boundary and a set of valid hard points in the base subset; and determining the closest hard point to a given soft point from among the hard points in the base subset, repeating for all subsets defining the QAM constellation including the base subset (i) rotating the given soft point to one other subset, (ii) for the rotated given soft point, finding a closest hard point in the base subset, and (iii) rotating the closest hard point in the base subset back to the one other subset.

15. The method as claimed in claim 14 further comprising the step of reporting the closest hard points in each subset found for the given soft point together with associated distances to a subset decoder that decodes the received soft points in the maximum likelihood sense.

16. The method according to claim 15 wherein the subset decoder is a Viterbi decoder.

17. The method as claimed in claim 14 wherein locating a closest valid hard point in the base subset further includes:
comparing soft points with the subset boundary;
for an exterior soft point located outside the subset boundary, projecting the exterior soft point along a respective imaginary line connecting to the constellation origin to define a respective intermediate soft point located within the subset boundary;
locating a closest QAM constellation hard point for the respective intermediate soft point; and
with respect to the exterior soft point, searching all hard points surrounding and including said closest QAM constellation hard point to determine the closest hard point in the base subset.

18. The method as claimed in claim 17 wherein projecting the exterior soft point includes:
defining a respective distance ratio of the subset boundary distance from the constellation origin compared to the distance of the exterior soft point from the constellation origin, the distance ratio being a scalar value less than one; and
multiplying coordinates of the exterior soft point by the respective distance ratio to project the exterior soft point inside of and including onto the subset boundary.

19. The method as claimed in claim 18 wherein defining the distance ratio includes computing:

$$(I_s^p, Q_s^p) = \frac{d_{max} - \epsilon}{d(I_s, Q_s)} \times (I_s, Q_s)$$

where $(I_s^p, Q_s^p)$ is the coordinate representation of the resulting projected soft point, $d_{max}$ is the distance of the subset boundary to the constellation origin, $\epsilon$ is a small positive real number, $d(I_s, Q_s)$ is the distance of the exterior soft point to the constellation origin, and $(I_s, Q_s)$ is the coordinate representation of the exterior soft point.

20. The method as claimed in claim 14 wherein defining a subset boundary includes defining a geometric shape about the constellation origin.

21. The method as claimed in claim 20 wherein the subset boundary passes through at least one hard point in the base subset, said at least one hard point being located farthest from the constellation origin as compared to other hard points in the base subset.

22. The method as claimed in claim 14, including aspects of infinite point slicing (IPS) and aspects of finite point slicing (FPS), the decoding having an average number of floating-point operations (FLOPS) performed per second about twice as much as infinite point slicing alone but being nearly independent of constellation size as compared to finite point slicing alone.

23. A digital communication device for receiving quadrature amplitude modulation (QAM) signals, the digital communication device employing a digital signal processor having a decoder for decoding received soft points into corresponding hard points in a QAM constellation, the decoder comprising:
a constellation generator generating hard points of a base subset of the QAM constellation in an infinite lattice spatially defined by a coordinate system having an origin located at the intersection of at least two axes;
a subset boundary identifier defining a subset boundary and a set of valid hard points in the base subset;
a filter coupled to the constellation generator and responsive to the subset boundary identifier, the filter determining the closest valid hard point to a given soft point from among the hard points in the base subset, the filter repeating for all the subsets defining the QAM constellation including the base subset (i) rotating the given soft point to one other subset, (ii) for the rotated given soft point, finding the closest valid hard point in the base subset, and (iii) rotating the closest hard point in the base subset back to the one other subset.

24. The digital communication device according to claim 23 further including an interface coupled to a subset decoder to report the closest hard points in each subset found for the given soft point together with associated distances to the subset decoder, said subset decoder decoding the received soft points in the maximum likelihood sense.

25. The digital communication device according to claim 24 wherein the subset decoder is a Viterbi decoder.

26. The digital communication device as claimed in claim 23 further comprising a projector to project soft points located outside the subset boundary to respective intermediate soft points located within the subset boundary of the QAM constellation.

27. The digital communication device as claimed in claim 26 further including a search engine that performs a search over a maximum of nine constellation points to locate the closest valid hard point in the base subset of the QAM constellation.

28. The digital communication device as claimed in claim 23 including aspects of infinite point slicing (IPS) and aspects of finite point slicing (FPS), the decoder having an average number of floating-point operations (FLOPS) per second about twice as much as infinite point slicing alone but being nearly independent of constellation size as compared to finite point slicing alone.

* * * * *